United States Patent Office 3,253,067
Patented May 24, 1966

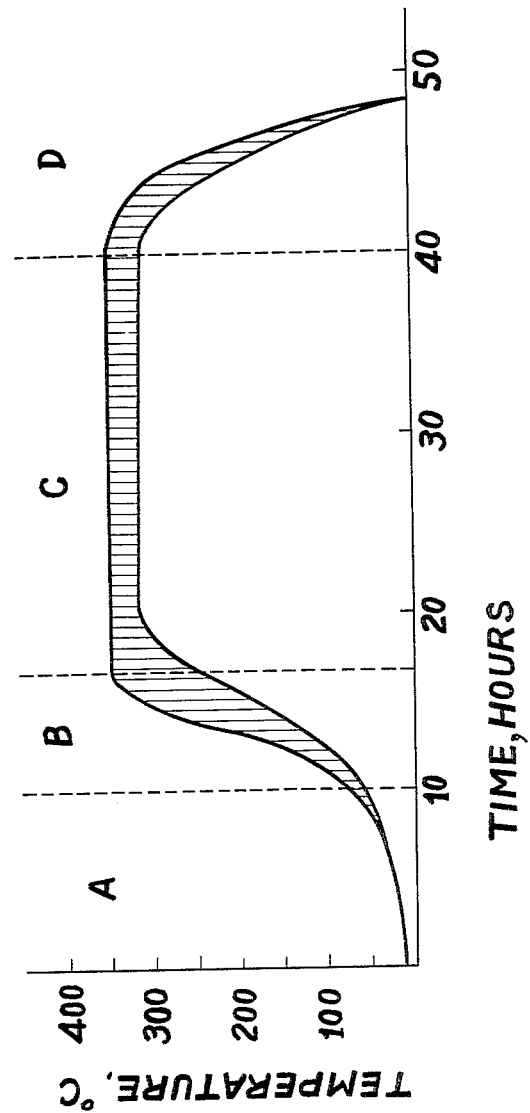

3,253,067
PROCESS FOR THE PRODUCTION OF
LADLE BRICKS
Yoshimori Tomita, 66 2-chome, Misaka-cho, Tajimi-shi, Japan, and Kikuo Ariga, 51–5 Toki-machi, Mizunami-shi, Japan
Filed Aug. 22, 1962, Ser. No. 218,756
6 Claims. (Cl. 264—63)

This invention relates to a method for the production of ladle bricks.

It is commonly known that slags and molten steel developed and prepared in the electric furnace during the production of alloy steel normally contain considerable amounts of corrosive substances such as MnO, CaO and the like, which have a strong tendency to chemically attack ladle bricks. As a counter measure for avoiding such a chemical attack, silicon carbide may be added as a constituent to the brick material mixture before the baking process stage. A considerable drawback is met according to our experience with use of such baked bricks, which contain silicon carbide, by the fact that the carbide will decompose and cracks may develop in the bricks as well as in the joints therebetween, as the results of contraction. This drawback will naturally reduce the practical life of a ladle lined with such bricks to a considerable degree, although their useful life is normally 2.0 to 2.5 times longer than that of conventional chamotte bricks.

It is therefore the main object of the invention to provide superior ladle bricks capable of substantially avoiding cracks caused by contraction of the bricks and joints therebetween, thus having a longer durable life, for instance 3.0 to 3.3 times that of conventional chamotte bricks.

Another object of the invention is to provide superior ladle bricks which are capable of expanading during use so that conventional joints between the bricks may be eliminated to achieve a practically continuous refractory layer on the inside wall surface of a ladle.

Still a further object of the invention is to provide superior ladle bricks, which are easy in their production and low in their production costs.

Further objects, special features and advantages of the present invention will appear from the following detailed description of the invention by way of several examples and a drawing, the latter illustrating graphically the drying stage of the process of the invention.

In advance of the disclosure of the several examples, the primary materials employed are listed hereinbelow, together with their origins, pyrometric cone equivalents (P.C.E.) and chemical compositions.

Agalmatolite:
    Origin: Chiisagata-gun, Nagano-ken, Japan
    P.C.E.: SK 28
    Composition: $SiO_2$, 73.81%; $Al_2O_3$, 18.52%; $Fe_2O_3$, 1.85%; $R_2O$, 1.38%; ign. loss, 4.35%.

Semidecomposed liparite:
    Origin: Yoshiki-gun, Gifu-ken, Japan
    P.C.E.: SK 26
    Composition: $SiO_2$, 72.35%; $Al_2O_3$, 15.96%; $Fe_2O_3$, 1.34%; $R_2O$, 3.84%; ign. loss, 5.34%:

Semidecomposed liparite:
    Origin: Amakusa-gun, Kumamoto-ken, Japan
    P.C.E.: SK 27
    Composition: $SiO_2$, 76.98%; $Al_2O_3$, 14.26%; $Fe_2O_3$, 1.37%; $R_2O$, 3.78%; ign. loss, 3.20%.

As for the silicon carbide, the corresponding material in compliance with the corresponding Japanese Industrial Standards (J.I.S.) is primarily employed. However, other materials than those prescribed in J.I.S. may also be employed. In the latter case, the analysis for purity amounted to 78–83% of SiC. The particle size was selected to be 200 mesh or finer.

In the following, several examples of mixing ratio shall be given:

Sample No. 1 of material mixture—
    Semidecomposed liparite (Amakusa):    Percent
        6–20 mesh _____ 55
        Finer than 20 mesh _____ 25
    Silicon carbide:
        Sieve No. 220, J.I.S. _____ 20
    Phosphoric acid:
        Technical grade _____ 3
    Water _____ 2

Sample No. 2 of material mixture—
    Semidecomposed liparite (Amakusa):
        6–20 mesh _____ 15
        Finer than 20 mesh _____ 25
    Semidecomposed liparite (Nagano):
        6–20 mesh _____ 30
    Silicon carbide:
        Not in compliance with J.I.S. _____ 30
    Waste liquor from paper pulp industry, dried
        to powder form _____ 3
    Water _____ 4

Sample No. 3 of material mixture—
    Agalmatolite:
        Finer than 6 mesh _____ 50
    Semidecomposed liparite (Amakusa):
        Finer than 6 mesh _____ 15
    Silicon carbide:
        Not in compliance with J.I.S., finer than
            200 mesh _____ 3
    Waste liquor from paper pulp industry, dried
        to powder form _____ 3
    Water _____ 4

Sample No. 4 of material mixture—    Percent
    Agalmatolite (Amakusa):
        6–20 mesh _____ 55
        Finer than 20 mesh _____ 25
    Silicon carbide:
        J.I.S. No. 220 _____ 20
    Phosphoric acid:
        Technical grade _____ 3
    Water _____ 2

Sample No. 5 of material mixture—
    Agalmatolite:
        6–20 mesh _____ 25
        Finer than 20 mesh _____ 15
    Semidecomposed liparite (Amakusa):
        6–20 mesh _____ 25
        Finer than 20 mesh _____ 10
    Silicon carbide:
        J.I.S. No. 220 _____ 25
    Waste liquor from paper pulp industry, dried to
        powder form _____ 3
    Water _____ 4

All the above-mentioned samples are adjusted, before processing according to the invention, in their sizes so as to fall within the following particle size distribution:

Mesh:    +20    20–60    60–100    100–200    −200
Percentage:   50–60    5–10    1–15    10–20    30–45

*Example*

A mixture selected from the above-mentioned samples and adjusted in its size distribution in the above explained manner, is charged into a conventional mixer such as ball mill or wet type kneader, and mixed thoroughly therein. In this case, care must be taken so as to obtain a thoroughly mixed mixture, wherein coarse and medium particles are covered completely by the fine constituents. When thoroughly mixed, the products can provide on a reliable basis desired physical properties at the normal and elevated temperatures and particularly the desired chemical properties at the elevated temperatures to which they will be subjected during use.

The thus obtained paste mixture is charged into a brick mould mounted on a friction- or hyraulic press and pressed gradually so as to obtain a homogeneous green ware. The pressing operation is preferably carried out in several repeated stages under pressure. The repetition of the pressing operations may preferably amount to 8–10 times. Since these pressing or shaping operations are final, and consequently may affect directly the nature and efficiency of the final products, care must also be taken to keep strictly the desired dimensions and specific weights of the pressed bricks at properly prescribed values. Caution must further be taken to avoid any hair cracks to appear in the pressed bricks during the pressing operations.

In order to dry the thus shaped pressed bricks, any conventional drier, such as tunnel drier, bed drier or the like, and any conventional technique such as hot air drying, resistance heating, induction heating or the like, may be employed as desired. The drying time and temperature may be preferably employed as shown in the attached drawing. In the drawing, part "A" denotes the initial pre-heating zone, wherein the temperature must be gradually elevated as shown so as to avoid possible cracks from developing in the pressed bricks under treatment. This zone may preferably extend for about 10 hours. The next part "B" is the quick heating-up zone, wherein the temperature can be elevated rather abruptly for effective drying. As a result of the initial gradual heating of the pressed bricks, the danger of possible crack formation is substantially obviated, so that the second abrupt heating step will not adversely affect yields of the products, or the desired physical and chemical properties thereof. The next following part "C" is the drying-up zone, wherein the elevated highest temperature is kept substantially over the whole range of the zone to accomplish the desired full drying. By this processing, the contained aqueous content as well as bound water are completely removed from the pressed bricks and the binding agent contained therein is also subjected sufficiently to an hardening reaction to provide the desired mechanical strength in the products.

The final part "D" is the cooling zone, wherein the temperature is reduced rather abruptly, which can not in any way adversely affect the desired properties of the products. Thus, the processing operations according to the invention are brought to the final.

It will be clear from the foregoing that according to the invention the desired ladle bricks can be produced without employing the conventional baking stage, thus in an easy and economical manner. In this way, amazing shortening of the processing time period, an improved yield of the final products, a remarkable simplification of the manufacturing process, reduction of fuel and labor costs and the like may be effectively realized, which constitutes a remarkable advance in the art.

According to actual tests, the thus obtained products from the hereinbefore noted sample mixtures Nos. 1–5 showed the following results:

|  | P.C.E. | Porosity, percent | Compressive strength, kg./cm.$^2$ | Loaded softening point, T$_2$, 2 kg./cm.$^2$, °C. |
| --- | --- | --- | --- | --- |
| (1) | SK 26 | 13.5 | 185 | 1,310 |
| (2) | SK 20 | 14.8 | 166 | 1,280 |
| (3) | SK 20 | 16.5 | 154 | 1,290 |
| (4) | SK 26 | 12.6 | 191 | 1,380 |
| (5) | SK 26 | 13.4 | 170 | 1,280 |

The P.C.E. as set forth above was determined by the conventional technique upon heating the products by means of an oxygen-propane gas flame torch.

It will be further clear that the products manufactured by the novel process, which comprises: mixing one or both of semidecomposed liparite and agalmatolite in their pulverized form and in a ratio of 50–95° by weight with silicon carbide in its pulverized form and in a ratio of 5–50% by weight and a small quantity of an organic or inorganic binding agent; moulding the mixture into green bricks and then drying said bricks by heating, have enough expandability while subjected to heating when used as linings of a ladle to provide for elimination of the conventional joint seams of cement mortar. More specifically, these green bricks can be, if manufactured in precise dimensions, laid without using cement mortar as above explained, so that when subjected to heating under the influence of molten steel poured into the ladle, the bricks may enough expand to provide a substantially continuous liner surface on the ladle wall, and thus considerable chemical attack otherwise encountered at conventional mortar joint seams may be completely obviated, in addition to easy handling of the bricks to constitute the whole liner construction. It can not be exaggerated that the above-mentioned novel feature has been firstly realized only by the present invention. Elimination of the conventional baking stage provides further an improved exactness in the dimensions of the final products, which fact will considerably ensure the realization of the above unique feature. Non-baking processing according to the invention will provide further such advantages that no distortion encountered during the manufacturing process and no decomposition of contained silicon carbide is experienced either during manufacture or during use, thus providing superior heat resisting characteristics of the products. A still further advantage obtained by the present invention resides in increased weight products in comparison with conventional baked fire resisting bricks.

Although in the foregoing, the invention has been described in detail by way of ladle bricks, the principles of the invention can be applied to the manufacture of nozzles, sleeves and the like conventionally employed in the steel manufacture, and thus in place of conventional acid refractories.

It should be finally mentioned that the ignition loss of the primary materials used in the inventive process, i.e., semidecomposed liparite and agalmatolite, must be preferably smaller than 8%. Otherwise, the possible thermal shrinkage of the products may exceed a tolerable level and lead to unfavorable results.

Although several particular and preferred examples of the invention have been herein disclosed, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Process for the production of unbaked refractory bricks comprising preparing a mixture of from 50 to 95% by weight of a pulverized solid material selected from the group consisting of agalmatolite, semidecomposed liparite and mixtures thereof, and 5 to 50% by weight of pulverized silicon carbide and a binding agent therefor, shaping the mixture into green bricks under pressure, and drying said bricks by heating them in four stages, the temperature being gradually raised to about 50° C. over about 10 hours in the first stage, then from about 50° C. to about 300° to about 350° C. over about a 6-hour period in the second stage, then kept substantially constant at about 300° to about 350° C. over about a 24-hour period in the third stage, and finally lowered to ambient temperature over about a 10-hour period in the fourth stage.

2. The process as set forth in claim 1 wherein the ignition loss of said pulverized solid material is less than 8% by weight.

3. The process as set forth in claim 1 wherein the binding agent is phosphoric acid.

4. Process for the production of unbaked refractory bricks comprising preparing a mixture of from 50 to 95% by weight of pulverized agalmatolite and 5 to 50% by weight of pulverized silicon carbide and a binding agent therefor, shaping the mixture into green bricks under pressure, and drying said bricks by heating them in four stages, the temperature being gradually raised to about 50° C. over about 10 hours in the first stage, then from about 50° C. to about 300° to 350° C. over about a 6-hour period in the second stage, then kept substantially constant at about 300° to about 350° C. over about a 24-hour period in the third stage, and finally lowered to ambient temperature over about a 10-hour period in the fourth stage.

5. Process for the production of unbaked refractory bricks comprising preparing a mixture of from 50 to 95% by weight of semidecomposed liparite and 5 to 50% by weight of pulverized silicon carbide and a binding agent therefor, shaping the mixture into green bricks under pressure, and drying said bricks by heating them in four stages, the temperature being gradually raised to about 50° C. over about 10 hours in the first stage, then from about 50° C. to about 300° to 350° C. over about a 6-hour period in the second stage, then kept substantially constant at about 300° to about 350° C. over about a 24-hour period in the third stage, and finally lowered to ambient temperature over about a 10-hour period in the fourth stage.

6. Process for the production of unbaked refractory bricks comprising preparing a mixture of from 50 to 95% by weight of a pulverized mixture of agalmatolite and semidecomposed liparite and 5 to 50% by weight of pulverized silicon carbide and a binding agent therefor, shaping the mixture into green bricks under pressure, and drying said bricks by heating them in four stages, the temperature being gradually raised to about 50° C. over about 10 hours in the first stage, then from about 50° C. to about 300° to 350° C. over about a 6-hour period in the second stage, then kept substantially constant at about 300° to about 350° C. over about a 24-hour period in the third stage, and finally lowered to ambient temperature over about a 10-hour period in the fourth stage.

References Cited by the Examiner

UNITED STATES PATENTS

| | | | |
|---|---|---|---|
| 1,204,211 | 5/1913 | Tone | 106—44 |
| 1,356,211 | 10/1920 | Linbarger | 106—44 |
| 1,483,507 | 2/1924 | Brockbank | 106—44 |
| 1,528,352 | 3/1925 | Walton | 106—44 |
| 2,458,285 | 1/1949 | Meyer | 106—67 |
| 2,526,073 | 10/1950 | Gardner | 106—67 |
| 2,543,548 | 2/1951 | Henry | 106—57 |

OTHER REFERENCES

Dana's Handbook of Mineralogy, April 1950, p. 661 relied upon.

ALEXANDER H. BRODMERKEL, *Primary Examiner.*

ROBERT F. WHITE, *Examiner.*